US010465060B2

(12) United States Patent
Miyamoto et al.

(10) Patent No.: US 10,465,060 B2
(45) Date of Patent: Nov. 5, 2019

(54) POLYAMIDE COMPOSITION AND MOLDED ARTICLE PRODUCED FROM THE COMPOSITION

(71) Applicant: UBE INDUSTRIES, LTD., Ube-shi, Yamaguchi (JP)

(72) Inventors: Akio Miyamoto, Ube (JP); Yasuharu Fukui, Ube (JP); Hiroki Akatsu, Ube (JP); Masaya Tonari, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 0 days.

(21) Appl. No.: 15/517,387

(22) PCT Filed: Oct. 27, 2015

(86) PCT No.: PCT/JP2015/080167
§ 371 (c)(1),
(2) Date: Apr. 6, 2017

(87) PCT Pub. No.: WO2016/068101
PCT Pub. Date: May 6, 2016

(65) Prior Publication Data
US 2017/0306126 A1    Oct. 26, 2017

(30) Foreign Application Priority Data

Oct. 27, 2014  (JP) .................................. 2014-218635
Oct. 31, 2014  (JP) .................................. 2014-223413

(51) Int. Cl.
| | | |
|---|---|---|
| C08K 3/04 | (2006.01) | |
| C08K 5/053 | (2006.01) | |
| C08K 5/3465 | (2006.01) | |
| C08K 7/06 | (2006.01) | |
| C08K 7/14 | (2006.01) | |
| C08L 77/02 | (2006.01) | |
| C08L 77/06 | (2006.01) | |

(52) U.S. Cl.
CPC .............. C08K 3/04 (2013.01); C08K 5/053 (2013.01); C08K 5/3465 (2013.01); C08K 7/06 (2013.01); C08K 7/14 (2013.01); *C08L 77/02* (2013.01); *C08L 77/06* (2013.01)

(58) Field of Classification Search
CPC ........ C08K 3/04; C08K 5/053; C08K 5/3465; C08K 7/06; C08K 7/14; C08L 77/02; C08L 77/06
See application file for complete search history.

(56) References Cited

U.S. PATENT DOCUMENTS

| | | | | |
|---|---|---|---|---|
| 5,373,039 | A | * 12/1994 | Sakai | ..................... B41M 5/267 430/292 |
| 5,804,638 | A | * 9/1998 | Hayashi | ................... C08K 3/04 524/494 |
| 6,231,979 | B1 | 5/2001 | Nagamine et al. | |
| 7,089,952 | B2 | * 8/2006 | Nakamura | .............. B32B 27/34 137/15.01 |
| 2003/0037831 | A1 | 2/2003 | Nakamura et al. | |
| 2005/0081991 | A1 | 4/2005 | Hatase et al. | |
| 2007/0123632 | A1 | * 5/2007 | Rexin | ..................... C08L 77/00 524/494 |
| 2009/0098325 | A1 | 4/2009 | Uchida et al. | |
| 2010/0009171 | A1 | * 1/2010 | Greb | ................... B29C 65/1677 428/328 |
| 2013/0187080 | A1 | * 7/2013 | Miyamoto | .............. C08L 77/00 252/75 |

FOREIGN PATENT DOCUMENTS

| | | |
|---|---|---|
| EP | 1 041 109 A2 | 10/2000 |
| JP | 8-127670 A | 5/1996 |
| JP | 2005-139445 A | 6/2005 |
| JP | 2006-241254 A | 9/2006 |
| JP | 2007-126555 A | 5/2007 |
| JP | 2011-32320 A | 2/2011 |
| JP | 4889987 B2 | 3/2012 |
| JP | 2012-158825 A | 8/2012 |
| WO | WO 2006/098434 A1 | 9/2006 |

OTHER PUBLICATIONS

International Search Report, issued as PCT/JP2015/080167, dated Jan. 19, 2016.

* cited by examiner

*Primary Examiner* — Patrick D Niland
(74) *Attorney, Agent, or Firm* — Birch, Stewart, Kolasch & Birch, LLP

(57) ABSTRACT

Provided is a polyamide resin composition comprising a polyamide resin, a PAN carbon fiber, carbon black, and a black dye, wherein the polyamide resin composition contains the PAN carbon fiber in an amount of 7.5 to 25% by weight, based on the weight of the composition, contains the carbon black in an amount of 0.01 to 0.55% by weight, based on the weight of the composition, and contains the black dye in an amount of 0.01 to 1.0% by weight, based on the weight of the composition.

5 Claims, 1 Drawing Sheet

POLYAMIDE COMPOSITION AND MOLDED ARTICLE PRODUCED FROM THE COMPOSITION

FIELD OF THE INVENTION

The present invention relates to a polyamide resin composition and a molded article produced from the composition.

BACKGROUND ART

Polyamide resins have excellent resistance to organic solvents, such as gasoline, and further have high fluidity upon melting so that they exhibit excellent moldability, and have excellent thermal properties and excellent mechanical properties. Therefore, the polyamide resins have been widely used as automotive exterior materials and engine room internal parts.

Fuel parts, such as a fuel cap, which are to be in contact with both a fuel and a part of a human body have a danger that electrostatic discharge generated when, for example, opening or closing a cap causes ignition. For this reason, for the purpose of suppressing the occurrence of discharge, a composition containing, for example, carbon black having electrical conductivity has been used in the fuel parts.

On the other hand, printing is often made on fuel parts, and the fuel parts are required to be suitable for laser marking which is excellent in respect of the cost and productivity. For achieving excellent laser marking property and excellent impact resistance, Japanese Unexamined Patent Publication No. 2011-32320 has proposed a composition comprising carbon black, a carbon fiber, aramid, and a metal-plated organic fiber masterbatch. Further, Japanese Patent No. 4889987 has proposed a polyamide resin composition comprising an ethylene-α-olefin copolymer, modified high-density polyethylene, and carbon black.

PRIOR ART REFERENCES

Patent Documents

Patent document 1: Japanese Unexamined Patent Publication No. 2011-32320
Patent document 2: Japanese Patent No. 4889987

SUMMARY OF THE INVENTION

Problems to be Solved by the Invention

The composition described in Japanese Unexamined Patent Publication No. 2011-32320, however, needs additionally a separate step for producing a masterbatch. Further, the polyamide resin composition described in Japanese Patent No. 4889987 does not satisfactorily meet both electrical conductivity and laser marking property.

An object of the present invention is to provide a polyamide resin composition which exhibits both excellent electrical conductivity and excellent laser marking property.

Means for Solving the Problems

The present inventors have extensive and intensive studies. As a result, it has been found that a polyamide resin composition containing a PAN carbon fiber, carbon black, and a black dye in respective specific amounts in a polyamide resin exhibits excellent electrical conductivity and excellent laser marking property.

Specifically, the present invention includes the following embodiments.

The first embodiment is a polyamide resin composition which comprises a polyamide resin, a PAN carbon fiber, carbon black, and a black dye, wherein the polyamide resin composition contains the PAN carbon fiber in an amount of 7.5 to 25% by weight, based on the weight of the composition, contains the carbon black in an amount of 0.01 to 0.55% by weight, based on the weight of the composition, and contains the black dye in an amount of 0.01 to 1.0% by weight, based on the weight of the composition.

The second embodiment is a molded article produced from the above-mentioned polyamide resin composition.

Effects of the Invention

By the present invention, there can be provided a polyamide resin composition which exhibits both excellent electrical conductivity and excellent laser marking property.

MODE FOR CARRYING OUT THE INVENTION

Figure 1:
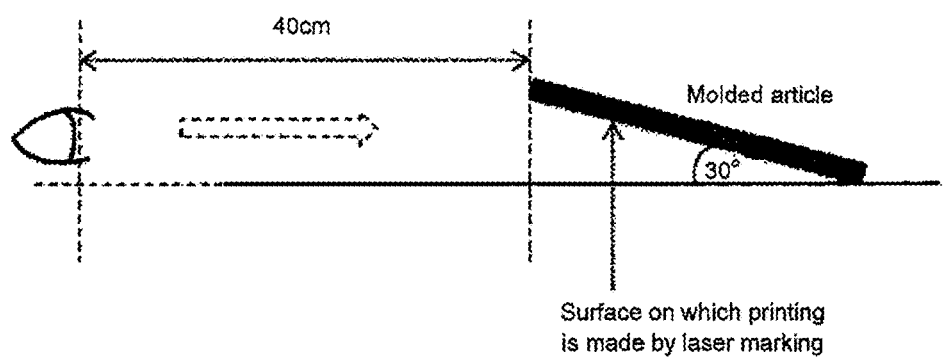
FIG. 1 A view illustrating the method for visually evaluating the laser marking property.

In the present specification, with respect to the amount of the component of the composition, when a plurality of materials corresponding to the components are present in the composition, the amount of the components in the composition means the total amount of the materials present in the composition unless otherwise specified.

The polyamide resin composition of the present invention is a polyamide resin composition comprising a polyamide resin, a PAN carbon fiber, carbon black, and a black dye, wherein the polyamide resin composition contains the PAN carbon fiber in an amount of 7.5 to 25% by weight, based on the weight of the composition, contains the carbon black in an amount of 0.01 to 0.55% by weight, based on the weight of the composition, and contains the black dye in an amount of 0.01 to 1.0% by weight, based on the weight of the composition.

[Polyamide Resin]

The polyamide resin has an amide linkage (—CONH—) in the principal chain thereof, and is obtained by polymerizing or copolymerizing, for example, a lactam, an aminocarboxylic acid, or a diamine and a dicarboxylic acid, or a diamine and an oxalic acid diester as a raw material by a known method, such as melt polymerization, solution polymerization, or solid phase polymerization.

Examples of lactams include ε-caprolactam, ω-enanthlactam, ω-undecalactam, ω-laurolactam, α-pyrrolidone, and α-piperidone, and preferred are ε-caprolactam and ω-laurolactam.

Examples of aminocarboxylic acids include aliphatic ω-aminocarboxylic acids, such as 6-aminocaproic acid, 7-aminoheptanoic acid, 8-aminooctanoic acid, 9-aminononanoic acid, 10-aminocapric acid, 11-aminoundecanoic acid, and 12-aminododecanoic acid, and preferred are 6-aminocaproic acid, 11-aminoundecanoic acid, and 12-aminododecanoic acid.

Examples of diamines include aliphatic diamines, such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-methyl-1,8-octanediamine, and 2,2,4/2,4,4-trimethylhexane-1,6-diamine; alicyclic diamines, such as 1,3-/1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3-/1,4-bisaminomethylcyclohexane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, and norbornanedimethyleneamine; and aromatic diamines, such as m-/p-xylylenediamine, and preferred are hexamethylenediamine, nonamethylenediamine, and 2-methyl-1,8-octanediamine.

Examples of dicarboxylic acids include aliphatic dicarboxylic acids, such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and eicosanedioic acid; alicyclic dicarboxylic acids, such as 1,3-/1,4-cyclohexanedicarboxylic acid, dicyclohexanemethane-4,4'-dicarboxylic acid, and norbornanedicarboxylic acid; and aromatic dicarboxylic acids, such as isophthalic acid, terephthalic acid, and 1,4-/1,8-/2,6-/2,7-naphthalenedicarboxylic acid, and preferred are oxalic acid and adipic acid.

Examples of oxalic acid diesters include oxalic acid diesters of an aliphatic alcohol, such as dimethyl oxalate, diethyl oxalate, di-n-(or i-)propyl oxalate, and di-n-(i-, or t-)butyl oxalate, oxalic acid diesters of an alicyclic alcohol, such as dicyclohexyl oxalate, and oxalic acid diesters of an aromatic alcohol, such as diphenyl oxalate. More preferred are di-n-butyl oxalate, di-i-butyl oxalate, and di-t-butyl oxalate, and further preferred is di-n-butyl oxalate.

As the polyamide resin, a polyamide resin which is a polymer of a lactam, an aminocarboxylic acid, or a diamine and a dicarboxylic acid, or a diamine and an oxalic acid diester, or a polyamide resin which is a copolymer of the above monomers can be used. The polyamide resin may be individually used, or two or more of the polyamide resins may be used in combination.

Examples of polyamide resins include polycaprolactam (polyamide 6), polyundecanelactam (polyamide 11), polydodecanelactam (polyamide 12), polyethyleneadipamide (polyamide 26), polytetramethyleneadipamide (polyamide 46), polyhexamethyleneadipamide (polyamide 66), polyhexamethyleneazelamide (polyamide 69), polyhexamethylenesebacamide (polyamide 610), polyhexamethyleneundecamide (polyamide 611), polyhexamethylenedodecamide (polyamide 612), polyhexamethyleneterephthalamide (polyamide 6T), polyhexamethyleneisophthalamide (polyamide 6I), polyhexamethylenehexahydroterephthalamide (polyamide 6T(H)), polynonamethyleneadipamide (polyamide 96), polynonamethyleneazelamide (polyamide 99), polynonamethylenesebacamide (polyamide 910), polynonamethylenedodecamide (polyamide 912), polynonamethyleneterephthalamide (polyamide 9T), polytrimethylhexamethyleneterephthalamide (polyamide TMHT), polynonamethylenehexahydroterephthalamide (polyamide 9T(H)), polynonamethylenenaphthalamide (polyamide 9N), polydecamethyleneadipamide (polyamide 106), polydecamethyleneazelamide (polyamide 109), polydecamethylenedecamide (polyamide 1010), polydecamethylenedodecamide (polyamide 1012), polydecamethyleneterephthalamide (polyamide 10T), polydecamethylenehexahydroterephthalamide (polyamide 10T(H)), polydecamethylenenaphthalamide (polyamide 10N), polydodecamethyleneadipamide (polyamide 126), polydodecamethyleneazelamide (polyamide 129), polydodecamethylenesebacamide (polyamide 1210), polydodecamethylenedodecamide (polyamide 1212), polydodecamethyleneterephthalamide (polyamide 12T), polydodecamethylenehexahydroterephthalamide (polyamide 12T(H)), polydodecamethylenenaphthalamide (polyamide 12N), polymetaxylyleneadipamide (polyamide MXD6), polymetaxylylenesuberamide (polyamide MXD8), polymetaxylyleneazelamide (polyamide MXD9), polymetaxylylenesebacamide (polyamide MXD10), polymetaxylylenedodecamide (polyamide MXD12), polymetaxylyleneterephthalamide (polyamide MXDT), polymetaxylyleneisophthalamide (polyamide MXDI), polymetaxylylenenaphthalamide (polyamide MXDN), polybis(4-aminocyclohexyl)methanedodecamide (polyamide PACM12), polybis(4-aminocyclohexyl)methaneterephthalamide (polyamide PACMT), polybis(4-aminocyclohexyl)methaneisophthalamide (polyamide PACMI), polybis(3-methyl-4-aminocyclohexyl)methanedodecamide
(polyamide dimethyl PACM12), polyisophoroneadipamide (polyamide IPD6), and polyisophoroneterephthalamide (polyamide IPDT).

Examples of copolymers include a caprolactam/hexamethylenediaminoadipic acid copolymer (polyamide 6/66), a caprolactam/hexamethylenediaminoazelaic acid copolymer (polyamide 6/69), a caprolactam/hexamethylenediaminosebacic acid copolymer (polyamide 6/610), a caprolactam/hexamethylenediaminoundecanoic acid copolymer (polyamide 6/611), a caprolactam/hexamethylenediaminododecanoic acid copolymer (polyamide 6/612), a caprolactam/aminoundecanoic acid copolymer (polyamide 6/11), a caprolactamllauryl lactam copolymer (polyamide 6/12), caprolactam/hexamethylenediaminoadipic acid/lauryl lactam (polyamide 6/66/12), caprolactam/hexamethylenediaminoadipic acid/hexamethylenediaminosebacic acid (polyamide 6/66/610), caprolactam/hexamethylenediaminoadipic acid/hexamethylenediaminododecanedicarboxylic acid (polyamide 6/66/612), polyamide 92/62, polyamide 102/62, polyamide 122/62, and a caprolactam/polyisophoroneadipamide copolymer (polyamide 6/IPD 6 copolymer).

Of these, from the viewpoint of the moldability, preferred is at least one polyamide selected from the group consisting of polyamide 6, polyamide 66, polyamide 610, polyamide 1010, polyamide 6/66, polyamide 11, polyamide 12, polyamide 6/12, and polyamide 6/66/12, more preferred is at least one polyamide selected from the group consisting of polyamide 6, polyamide 66, polyamide 6/66, polyamide 11, polyamide 12, polyamide 610, and polyamide 1010, and further preferred is polyamide 6 and/or polyamide 66.

The polyamide resin preferably has a relative viscosity of 1.0 to 6.0, as measured under the conditions in 96% by mass sulfuric acid at a polyamide concentration of 1% by mass at a temperature of 25° C. in accordance with JIS K-6920. When the relative viscosity of the polyamide resin is in the above range, the resultant composition has an appropriate viscosity upon melting so that molding of the composition is facilitated, making it possible to impart excellent mechanical properties to the molded article obtained. From the same point of view, the relative viscosity of the polyamide resin is more preferably 1.5 to 5.0, further preferably 1.7 to 4.5, especially preferably 2.2 to 3.5.

From the viewpoint of the adhesion upon injection welding, it is preferred that the polyamide resin comprises a polyamide resin having a terminal amino group concentration ($10^{-5}$ eq/g) which is larger than a terminal carboxyl group concentration ($10^{-5}$ eq/g). It is more preferred that all the polyamide resin is a polyamide resin having a terminal amino group concentration ($10^{-5}$ eq/g) which is larger than a terminal carboxyl group concentration ($10^{-5}$ eq/g). It is further preferred that the ratio of the terminal amino group concentration to the terminal carboxyl group concentration is 1.1 or more, further preferably 1.5 to 40.0.

The terminal amino group concentration ($10^{-5}$ eq/g) can be measured by dissolving a polyamide resin in a phenol/methanol mixed solution and subjecting the resultant solution to titration with 0.05 N hydrochloric acid. The terminal carboxyl group concentration ($10^{-5}$ eq/g) can be measured by dissolving a polyamide resin in benzyl alcohol and subjecting the resultant solution to titration with a 0.05 N sodium hydroxide solution.

Terminal modified polyamide is produced by performing polymerization or copolymerization in the presence of an amine by a known method, such as melt polymerization, solution polymerization, or solid phase polymerization. Alternatively, terminal modified polyamide is produced by performing polymerization and then melt-kneading the resultant polymer in the presence of an amine. Thus, an amine can be added on an arbitrary stage during the polymerization, or on an arbitrary stage during the melt-kneading after polymerization. However, taking into consideration the adhesion upon injection welding, it is preferred to add an amine on a stage during the polymerization.

Examples of the amines include monoamines, diamines, triamines, and polyamines. In addition to the amine, if necessary, a carboxylic acid, such as a monocarboxylic acid, a dicarboxylic acid, or a tricarboxylic acid, may be added in such an amount that the above-mentioned requirements for the terminal group concentrations are satisfied. The amine and carboxylic acid may be added at the same time or separately. Further, the below-mentioned amines and carboxylic acids can be used individually or in combination.

Specific examples of the monoamines added include aliphatic monoamines, such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine, and docosylamine; alicyclic monoamines, such as cyclohexylamine and methylcyclohexylarnine; aromatic monoamines, such as benzylamine and β-phenylmethylamine; symmetric secondary amines, such as N,N-dimethylamine, N,N-diethylamine, N,N-dipropylamine, N,N-dibutylamine, N,N-dihexylamine, and N,N-dioctylamine; and mixed secondary amines, such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine, and N-propyl-N-benzylamine. These can be used individually or in combination.

Specific examples of the diamines added include aliphatic diamines, such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2-methyl-1,5-pentanediamine, 3-methyl-1,5-pentanediamine, 2-methyl-1,8-octanediamine, 2,2,4-trimethyl-1,6-hexanediamine, 2,4,4-trimethyl-1,6-hexanediamine, and 5-methyl-1,9-nonanediamine; alicyclic diamines, such as 1,3-bis(aminomethyl)cyclohexane, 1,4-bis(aminomethyl)cyclohexane, bis(4-aminocyclohexyl)methane, 2,2-bis(4-aminocyclohexyl)propane, bis(3-methyl-4-aminocyclohexyl)methane, 2,2-bis(3-methyl-4-aminocyclohexyl)propane, 5-amino-2,2,4-trimethyl-1-cyclopentaneme- thylamine, 5-amino-1,3,3-trimethylcyclohexanemethylamine, bis(aminopropyl)piperazine, bis(aminoethyl)piperazine, 2,5-bis(aminomethyl)norbornane, 2,6-bis(aminomethyl)norbornane, 3,8-bis(aminomethyl)tricyclodecane, and 4,9-bis(aminomethyl)tricyclodecane; and aromatic diamines, such as m-xylylenediamine and p-xylylenediamine. These can be used individually or in combination.

Specific examples of the triamines added include 1,2,3-triaminopropane, 1,2,3-triamino-2-methylpropane, 1,2,4-triaminobutane, 1,2,3,4-tetraminobutane, 1,3,5-triaminocyclohexane, 1,2,4-triaminocyclohexane, 1,2,3-triaminocyclohexane, 1,3,5-triaminobenzene, 1,2,4-triaminobenzene, 1,2,3-triaminobenzene, 1,2,4-triaminonaphthalene, 2,5,7-triaminonaphthalene, and 2,4,6-triaminopyridine. Specific examples of tetramines include 1,2,4,5-tetraminocyclohexane, 1,2,4,5-tetraminobenzene, 1,2,7,8-tetraminonaphthalene, and 1,4,5,8-tetraminonaphthalene. These can be used individually or in combination.

The polyamine added may be a compound having a plurality of primary amino groups (—NH$_2$) and/or secondary amino groups (—NH—), and examples of the polyamines include polyalkylenimine, polyalkylenepolyamine, polyvinylamine, and polyallylamine. An amino group having active hydrogen serves as a reaction site of polyamine.

Polyalkylenimine is produced by, for example, a method in which an alkylenimine, such as ethylenimine or propylenimine, is subjected to ionic polymerization, or a method in which an alkyloxazoline is polymerized and then the resultant polymer is subjected to partial hydrolysis or complete hydrolysis. Examples of polyalkylenepolyamines include diethylenetriamine, triethylenetetramine, pentaethylenehexamine, and reaction products of ethylenediamine and a polyfunctional compound. Polyvinylamine is obtained by, for example, polymerizing N-vinylformamide to form poly(N-vinylformamide), and then subjecting the resultant polymer to partial hydrolysis or complete hydrolysis using an acid, such as hydrochloric acid. Polyallylamine is generally obtained by polymerizing a hydrochloride of an allylamine monomer and then removing hydrochloric acid from the resultant polymer. These can be used individually or in combination. Of these, preferred is polyalkylenimine.

Examples of polyalkylenimines include homopolymers and copolymers, which are obtained by polymerizing one, or two or more alkylenimines having 2 to 8 carbon atoms, such as ethylenimine, propylenimine, 1,2-butylenimine, 2,3-butylenimine, or 1,1-dimethylethylenimine, by a general method. Of these, polyethylenimine is more preferred. The polyalkylenimine may be any of branched polyalkylenimine containing a primary amine, a secondary amine, and a tertiary amine, which is obtained by subjecting an alkylenimine as a raw material to ring-opening polymerization, linear polyalkylenimine containing only a primary amine and a secondary amine, which is obtained by subjecting an alkyloxazoline as a raw material to polymerization, and polyalkylenimine having a three-dimensionally crosslinked structure. Further, the polyalkylenimine may be those containing, for example, ethylenediamine, propylenediamine, diethylenetriamine, triethylenetetramine, tetraethylenepentamine, dipropylenetriamine, tripropylenetetramine, dihexamethylenetriamine, aminopropylethylenediamine, or bisaminopropylethylenediamine. The polyalkylenimine generally has a tertiary amino group derived from the reactivity of an active hydrogen atom on the nitrogen atom contained therein as well as a primary amino group and a secondary amino group (imino group) each having an active hydrogen atom.

With respect to the number of nitrogen atoms in the polyalkylenimine, there is no particular limitation. However, the number of nitrogen atoms in the polyalkylenimine is preferably 4 to 3,000, more preferably 8 to 1,500, further preferably 11 to 500. Further, the number average molecular weight of the polyalkylenimine is preferably 100 to 20,000, more preferably 200 to 10,000, further preferably 500 to 8,000.

On the other hand, examples of the carboxylic acids added include aliphatic monocarboxylic acids, such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachic acid, behenic acid, and erucic acid; alicyclic monocarboxylic acids, such as cyclohexanecarboxylic acid and methylcyclohexanecarboxylic acid; aromatic monocarboxylic acids, such as benzoic acid, toluic acid, ethylbenzoic acid, and phenylacetic acid; aliphatic dicarboxylic acids, such as malonic acid, succinic acid, glutaric acid, adipic acid, pimelic acid, suberic acid, azelaic acid, sebacic acid, undecanedioic acid, dodecanedioic acid, hexadecanedioic acid, hexadecenedioic acid, octadecanedioic acid, octadecenedioic acid, eicosanedioic acid, eicosenedioic acid, docosanedioic acid, diglycolic acid, 2,2,4-trimethyladipic acid, and 2,4,4-trimethyladipic acid; alicyclic dicarboxylic acids, such as 1,3-cyclohexanedicarboxylic acid, 1,4-cyclohexanedicarboxylic acid, and norbornanedicarboxylic acid; aromatic dicarboxylic acids, such as terephthalic acid, isophthalic acid, phthalic acid, m-xylylenedicarboxylic acid, p-xylylenedicarboxylic acid, 1,4-naphthalenedicarboxylic acid, 2,6-naphthalenedicarboxylic acid, and 2,7-naphthalenedicarboxylic acid; and tricarboxylic acids, such as 1,2,4-butanetricarboxylic acid, 1,3,5-pentanetricarboxylic acid, 1,2,6-hexanetricarboxylic acid, 1,3,6-hexanetricarboxylic acid, 1,3,5-cyclohexanetricarboxylic acid, and trimesic acid. These can be used individually or in combination.

The amount of the amine used is appropriately determined by a known method, taking into consideration the terminal amino group concentration, terminal carboxyl group concentration, and relative viscosity of the polyamide resin to be produced. Generally, from the viewpoint of obtaining satisfactory reactivity and facilitating the production of a polyamide resin having a desired viscosity, the amount of the amine added is preferably 0.5 to 20 meq/mol, more preferably 1.0 to 10 meq/mol, relative to 1 mol of the monomer or monomer unit constituting the repeating units. (With respect to the equivalent (eq) of an amino group, one equivalent corresponds to the amount of the amino group which reacts with a carboxyl group in a 1:1 ratio to form an amide group.)

With respect to the polyamide resin, for satisfying the requirements for the terminal group concentrations, among the above-mentioned amines, a diamine and/or a polyamine is preferably added upon polymerization, and, from the viewpoint of suppressing the occurrence of gelation, at least one member selected from the group consisting of an aliphatic diamine, an alicyclic diamine, and a polyamine is more preferably added.

Examples of apparatuses for producing a polyamide resin include known apparatuses for producing polyamide, e.g., kneading reaction extruders, such as a batch-wise reaction vessel, a single-chamber or multi-chamber type continuous reaction apparatus, a tubular continuous reaction apparatus, a single-screw kneading extruder, and a twin-screw kneading extruder. Polymerization can be performed using, as a polymerization method, a known method, such as melt polymerization, solution polymerization, or solid phase polymerization, by repeating the operations under atmospheric pressure, under a reduced pressure, and under an increased pressure. These polymerization methods can be used individually or appropriately in combination.

[PAN carbon fiber] The PAN carbon fiber is a carbon fiber obtained by carbonizing a polyacrylonitrile fiber.

With respect to the fiber length of the PAN carbon fiber, the PAN carbon fiber may be a short fiber or a continuous fiber having a length as long as 1,000 mm depending on the use of the composition. However, from the viewpoint of the productivity, for example, feeding properties of the composition into a twin-screw kneader, the fiber length of the PAN carbon fiber before being kneaded is preferably 0.1 to 20 mm, more preferably 1 to 15 mm.

With respect to the fiber diameter of the PAN carbon fiber, there is no particular limitation. However, the PAN carbon fiber having a smaller fiber diameter likely exhibits a strength in the resultant resin composition or molded article, but the PAN carbon fiber having too small a fiber diameter is likely to suffer fibrillation of the carbon fiber, for example, when being fed into a kneader, lowering the production efficiency upon kneading. From the viewpoint of the productivity when using a kneader and mechanical physical properties, such as a strength, the PAN carbon fiber having a fiber diameter of 5 to 15 μm is preferred. A masterbatch preliminarily prepared by adding a carbon fiber in a high concentration to a resin, or granulated carbon fiber is unlikely to suffer fibrillation of the carbon fiber during the production of a polyamide resin composition, and therefore a very fine carbon fiber is preferably used.

[Carbon Black]

Carbon black may be any of furnace black obtained by a furnace method, channel black obtained by a channel method, acetylene black obtained by an acetylene method, and thermal black obtained by a thermal method, but is preferably acetylene black from the viewpoint of the electrical conductivity, and is preferably furnace black from the viewpoint of the availability and cost.

[Black Dye]

Examples of black dyes include nigrosine and aniline black, and any of them can be used to achieve a similar effect, but, from the viewpoint of the cost and moldability, preferred is nigrosine. Examples of commercially available nigrosine products include SPIRIT BLACK SB, SPIRIT BLACK AB, SPIRIT BLACK SA, SPIRIT BLACK SZ, nigrosine base EE, nigrosine base EX, and nigrosine base EX-BP, manufactured by Orient Chemical Industries Co., Ltd.

[Glass Fiber]

The polyamide resin composition preferably contains a glass fiber from the viewpoint of improving the impact resistance.

Taking into consideration the feeding properties of the composition into a kneader or the like, the glass fiber is preferably sized with a sizing agent.

With respect to the sizing agent, from the viewpoint of the compatibility with the polyamide resin, an urethane resin and/or an acrylic resin is preferred. From the viewpoint of further improving the compatibility with the polyamide resin, an acrylic resin is further preferred.

From the viewpoint of improving the dispersibility into and adhesion to the polyamide resin, the glass fiber is preferably surface-treated with a surface treatment agent. Examples of surface treatment agents include a silane compound, a chrome compound, and a titanium compound, and preferred is a surface treatment agent comprised of a silane compound and/or a titanium compound.

As a surface treatment agent comprised of a silane compound, preferred is an aminosilane coupling agent having excellent adhesion to the sizing agent, and examples of such aminosilane coupling agents include γ-aminopropyltrimethoxysilane, γ-athinopropyltriethoxysilane, N-phenyl-γ-aminopropyltrimethoxysilane, N-β-(aminoethyl)-γ-aminopropyltrimethoxysilane, N-β-(aminoethyl)-γ-aminopropyltriethoxysilane, γ-aminodithiopropyltrihydroxysilane, γ-(polyethyleneamino)propyltrimethoxysilane, N-β-(aminopropyl)-γ-aminopropylmethyldimethoxysilane, N-(trimethoxysilylpropyl)-ethylenediamine, and γ-dibutylaminopropyltrimethoxysilane. These can be used individually or in combination.

Examples of surface treatment agents comprised of a titanium compound include isopropyltriisostearoyl titanate, isopropyltri(N-aminoethyl) titanate, isopropyltris(dioctyl pyrophosphate) titanate, tetraisopropylbis(dioctyl phosphite) titanate, tetraisopropyl titanate, tetrabutyl titanate, tetraoctylbis(ditridecyl phosphite) titanate, isopropyltrioctanoyl titanate, isopropyltridodecylbenzenesulfonyl titanate, isopropyltri(dioctyl phosphate) titanate, bis(dioctyl pyrophosphate)ethylene titanate, isopropyldimethacrylisostearoyl titanate, tetra(2,2-diallyloxymethyl-1-butyl)bis(ditridecyl phosphite) titanate, isopropyltricumylphenyl titanate, bis(dioctyl pyrophosphate) oxyacetate titanate, and isopropylisostearoyldiacryl titanate. These can be used individually or in combination.

Of these, preferred is at least one member selected from the group consisting of N-β-(aminoethyl)γ-aminopropyltrimethoxysilane, N-β-(aminoethyl)γ-aminopropylmethyldimethoxysilane, and γ-aminopropyltriethoxysilane.

With respect to the glass fiber, a glass fiber having a circular cross-section taken along the direction perpendicular to the longitudinal direction and/or a glass fiber having a non-circular cross-section taken along the direction perpendicular to the longitudinal direction can be used.

With respect to the average fiber diameter of the glass fiber having a circular cross-section, there is no particular limitation. However, from the viewpoint of the dimensional stability and mechanical properties of the obtained molded article, the average fiber diameter of the glass fiber having a circular cross-section is preferably 5 to 25 μm, more preferably 5 to 24 μm, further preferably 6 to 23 μm.

The average fiber diameter of the glass fiber having a circular cross-section can be measured in accordance with JIS R3420.

In the glass fiber having a non-circular cross-section taken along the direction perpendicular to the longitudinal direction, the ratio of the long diameter to the short diameter in the cross-section taken along the direction perpendicular to the longitudinal direction of the fiber is 1.2 to 10. In the glass fiber having a non-circular cross-section, from the viewpoint of the low warpage and mechanical properties, the ratio of the long diameter to the short diameter in the cross-section taken along the direction perpendicular to the longitudinal direction of the fiber is preferably 1.2 to 10, more preferably 1.5 to 6, further preferably 1.7 to 4.5. The long diameter indicates the largest length of the straight line which connects arbitrary two points on the contour of the cross-section, and the short diameter indicates the smallest length of the straight line which is perpendicular to the long diameter, and which connects the two points on the contour of the cross-section.

In the glass fiber having a non-circular cross-section, the long diameter is preferably 2 to 100 μm, and the short diameter is preferably 1 to 20 μm.

The glass fiber having a non-circular cross-section may be one having a predetermined ratio of the long diameter to the short diameter, and, generally, one having a cross-section of a cocoon, ellipse, semicircular, circular arc, rectangular, or parallelogram form or a form similar to them is used. In practice, from the viewpoint of the fluidity, mechanical properties, and low warpage, preferred is a glass fiber having a cross-section of a cocoon, ellipse, or rectangular form.

[Fluidity-Improving Agent]

From the viewpoint of improving the fluidity, the polyamide resin composition preferably contains a fluidity-improving agent.

Examples of fluidity-improving agents include dicarboxylic acids and polyhydric alcohols, and polyhydric alcohols are preferred from the viewpoint of the reactivity with the polyamide resin.

Examples of dicarboxylic acids include aliphatic dicarboxylic acids and aromatic dicarboxylic acids, and specific examples include oxalic acid, malonic acid, succinic acid, adipic acid, azelaic acid, sebacic acid, phthalic acid, and terephthalic acid.

Polyhydric alcohols include not only polyhydric alcohols but also partial ester compounds of a polyhydric alcohol with a fatty acid, and partial ester compounds of an alkylene oxide addition product of a polyhydric alcohol with a fatty acid. Specific examples of polyhydric alcohols include ethylene glycol, propylene glycol, 1,3-/1,4-butanediol, 2-methyl-1,3-propanediol, 1,2-/1,3-/1,4-/1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, glycerol, diglycerol, triglycerol, tetraglycerol, polyglycerol, trimethylolethane, trimethylolpropane, ditrimethylolpropane, tri-(trimethylolpropane), trimethylolbutane, erythritol, pentaerythritol, dipentaerythritol, tripentaerythritol, polypentaerythritol, 1,2,4-butanetriol, 1,3,5-pentanetriol, 1,2,6-hexanetriol, 1,2,3,4-butanetetrol, sorbitan, isosorbite, sorbitol, adonitol, arabitol, xylitol, mannitol, xylose, arabinose, ribose, rhamnose, glucose, fructose, galactose, mannose, sorbose, cellobiose, maltose, isomaltose, trehalose, sucrose, raffinose, gentianose, and melezitose.

Of these, from the viewpoint of the improvement of the fluidity, preferred is at least one polyhydric alcohol selected from the group consisting of pentaerythritol, polyglycerol, trimethylolethane, trimethylolpropane, dipentaerythritol, sorbitan, and sorbitol, and more preferred is at least one polyhydric alcohol selected from the group consisting of pentaerythritol, dipentaerythritol, polyglycerol, trimethylolethane, and trimethylolpropane. From the viewpoint of suppressing scattering of the composition during the kneading or molding and achieving excellent dispersibility, further preferred is at least one polyhydric alcohol selected from the group consisting of pentaerythritol, polyglycerol, dipentaerythritol, and trimethylolethane, and especially preferred is at least one polyhydric alcohol selected from the group consisting of pentaerythritol, dipentaerythritol, and trimethylolethane.

[Polyamide Resin Composition]

The polyamide resin composition contains the PAN carbon fiber in an amount of 7.5 to 25% by weight, the carbon black in an amount of 0.01 to 0.55% by weight, and the black dye in an amount of 0.01 to 1.0% by weight, based on the weight of the composition.

The polyamide resin composition contains the PAN carbon fiber in an amount of 7.5 to 25% by weight, based on the weight of the composition, and, from the viewpoint of the electrical conductivity, preferably in an amount of 8 to 20% by weight, more preferably in an amount of 8 to 15% by weight.

From the viewpoint of the electrical conductivity, the proportion of the PAN carbon fiber to the polyamide resin is preferably 10.0 to 40.0% by weight, more preferably 12.0 to 25.0% by weight.

The polyamide resin composition contains the carbon black in an amount of 0.01 to 0.55% by weight, based on the weight of the composition, and, from the viewpoint of the laser marking property, preferably in an amount of 0.03 to 0.52% by weight, more preferably in an amount of 0.05 to 0.5% by weight.

From the viewpoint of the laser marking property, the proportion of the carbon black to the polyamide resin is preferably 0.02 to 1.20% by weight, more preferably 0.05 to 1.00% by weight. From the viewpoint of the electrical conductivity and laser marking property, the proportion of the carbon black to the PAN carbon fiber is preferably 0.1 to 2.5% by weight, more preferably 0.6 to 3.5% by weight.

The polyamide resin composition contains the black dye in an amount of 0.01 to 1.0% by weight, based on the weight of the composition, and, from the viewpoint of the laser marking property, moldability, and impact resistance, preferably in an amount of 0.01 to 0.5% by weight, more preferably in an amount of 0.02 to 0.5% by weight, further preferably in an amount of 0.03 to 0.3% by weight, especially preferably in an amount of 0.05 to 0.3% by weight.

From the viewpoint of the laser marking property, moldability, and impact resistance, the proportion of the black dye to the polyamide resin is preferably 0.02 to 2.00% by weight, more preferably 0.08 to 0.75% by weight. From the viewpoint of the laser marking property, the proportion of the black dye to the carbon black is preferably 1.5 to 99.0% by weight, more preferably 10.0 to 90.0% by weight.

From the viewpoint of the impact resistance, the polyamide resin composition contains the glass fiber preferably in an amount of 15 to 60% by weight, more preferably in an amount of 25 to 50% by weight, further preferably in an amount of 30 to 45% by weight, based on the weight of the composition.

From the viewpoint of the impact resistance, the proportion of the glass fiber to the polyamide resin is preferably 20 to 55% by weight, more preferably 35 to 50% by weight.

From the viewpoint of the improvement of the fluidity, the polyamide resin composition contains the fluidity-improving agent preferably in an amount of 0.01 to 5% by weight, more preferably in an amount of 0.03 to 4% by weight, further preferably in an amount of 0.05 to 3% by weight, based on the weight of the composition.

From the viewpoint of the improvement of the fluidity, the proportion of the fluidity-improving agent to the polyamide resin is preferably 0.02 to 10% by weight, more preferably 0.08 to 6.0% by weight.

From the viewpoint of the mechanical properties, the polyamide resin composition contains the polyamide resin preferably in an amount of 20 to 100% by weight, more preferably in an amount of 70 to 100% by weight, further preferably in an amount of 90 to 100% by weight, based on the weight of the remainder obtained by removing the PAN carbon fiber, carbon black, black dye, glass fiber, and fluidity-improving agent from the composition.

Examples of methods for producing the polyamide resin composition include a dry blending method using a tumbler or a mixer, a melt-kneading method using a single-screw or twin-screw extruder, and a masterbatch method in which a resin is preliminarily kneaded in a high concentration into raw materials using a single-screw or twin-screw extruder and the resultant mixture is diluted before use. From the viewpoint of improving the dispersibility, preferred is a melt-kneading method.

The polyamide resin composition can contain various additives, modifier, or reinforcing agent generally incorporated, for example, a heat stabilizer, an antioxidant, an ultraviolet light absorber, a weathering agent, a filler, a plasticizer, a foaming agent, an anti-blocking agent, a tackifier, a sealing property improver, an anti-fogging agent, a release agent, a crosslinking agent, a foaming agent, a dispersant, a flame retardant, a colorant (such as a pigment or a dye), a coupling agent, or an inorganic compound other than glass, such as talc, in such an amount that the properties of the composition are not sacrificed.

Further, in the polyamide resin composition, a thermoplastic resin other than the polyamide resin may be used in such an amount that the properties of the composition are not sacrificed.

Examples of thermoplastic resins other than the polyamide resins include polyolefin resins, such as high-density polyethylene (HDPE), medium-density polyethylene (MDPE), low-density polyethylene (LDPE), linear low-density polyethylene (LLDPE), ultrahigh molecular-weight polyethylene (UHMWPE), polypropylene (PP), polybutene (PB), polymethylpentene (TPX), an ethylene/propylene copolymer (EPR), an ethylene/butene copolymer (EBR), an ethylene/vinyl acetate copolymer (EVA), an ethylene/acrylic acid copolymer (EAA), an ethylene/methacrylic acid copolymer (EMAA), an ethylene/methyl acrylate copolymer (EMA), an ethylene/methyl methacrylate copolymer (EMMA), and an ethylene/ethyl acrylate copolymer (EEA); polystyrene resins, such as polystyrene (PS), syndiotactic polystyrene (SPS), a methyl methacrylate/styrene copolymer (MS), a methyl methacrylate/styrene/butadiene copolymer (MBS), a styrene/butadiene copolymer (SBR), a styrene/isoprene copolymer (SIR), a styrene/isoprene/butadiene copolymer (SIBR), a styrene/butadiene/styrene copolymer (SBS), a styrene/isoprene/styrene copolymer (SIS), a styrene/ethylene/butylene/styrene copolymer (SEBS), and a styrene/ethylene/propylene/styrene copolymer (SEPS); the above-mentioned polyolefin resins and polystyrene resins which contain a functional group, such as a carboxyl group or a salt thereof, an acid anhydride group, or an epoxy group; polyester resins, such as polybutylene terephthalate (PBT), polyethylene terephthalate (PET), polyethylene isophthalate (PEI), a poly(ethylene terephthalate/ethylene isophthalate) copolymer (PET/PEI), polytrimethylene terephthalate (PTT), polycyclohexanedimethylene terephthalate (PCT), polyethylene naphthalate (PEN), polybutylene naphthalate (PBN), polyarylate (PAR), liquid crystalline polyester (LCP), polylactic acid (PLA), and polyglycolic acid (PGA); polyether resins, such as polyacetal (POM) and polyphenylene ether (PPO); polysulfone resins, such as polysulfone (PSU), polyether sulfone (PESU), and polyphenyl sulfone (PPSU); polythioether resins, such as polyphenylene sulfide (PPS) and polythioether sulfone (PTES); polyketone resins, such as polyketone (PK), polyether ketone (PEK), polyether ether ketone (PEEK), polyether ketone ketone (PEKK), polyether ether ether ketone (PEEEK), polyether ether ketone ketone (PEEKK), polyether ketone ketone ketone (PEKKK), and polyether ketone ether ketone ketone (PEKEKK); polynitrile resins, such as polyacrylonitrile (PAN), polymethacrylonitrile, an acrylonitrile/styrene copolymer (AS), a methacrylonitrile/styrene copolymer, an acrylonitrile/butadiene/styrene copolymer (ABS), and an acrylonitrile/butadiene copolymer (NBR); polymethacrylate resins, such as polymethyl methacrylate (PMMA) and polyethyl methacrylate (PEMA); polyvinyl resins, such as polyvinyl alcohol (PVA), polyvinylidene chloride (PVDC), polyvinyl chloride (PVC), a vinyl chloride/vinylidene chloride copolymer, and a vinylidene chloride/methyl acrylate copolymer; cellulose resins, such as cellulose acetate and cellulose butyrate; fluororesins, such as polyvinylidene fluoride (PVDF), polyvinyl fluoride (PVF), polytetrafluoroethylene (PTFE), polychlorofluoroethylene (PCTFE), a tetrafluoroethylene/ethylene copolymer (ETFE), an ethylene/chlorotrifluoroethylene copolymer (ECTFE), a tetrafluoroethylene/hexafluoropropylene copolymer (FEP), a tetrafluoroethylene/hexafluoropropylene/vinylidene fluoride copolymer (THV), a tetrafluoroethylene/hexafluoropropylene/vinylidene fluoride/perfluoro(alkylvinyl ether) copolymer, a tetrafluoroethylene/perfluoro(alkylvinyl ether) copolymer (PFA), a tetrafluoroethylene/hexafluoropropylene/perfluoro(alkylvinyl ether) copolymer, and a chlorotrifluoroethylene/perfluoro(alkylvinyl ether)/tetrafluoroethylene copolymer (CPT); polycarbonate resins, such as polycarbonate (PC); polyimide resins, such as thermoplastic polyimide (TPI), polyether imide, polyester imide, polyamide-imide (PAD, and polyester amide-imide; thermoplastic polyurethane resins; polyamide elastomers; polyurethane elastomers; and polyester elastomers. These can be used individually or in combination.

The polyamide resin composition has excellent electrical conductivity and excellent laser marking property, and therefore can be advantageously used in a fuel part which is required to be subjected to laser marking.

[Molded Article]

A molded article produced from the polyamide resin composition of the present invention is molded by, for example, injection molding, extrusion molding, blow molding, press molding, roll molding, expansion molding, vacuum or pressure molding, or stretch molding, but, from the viewpoint of the productivity, injection molding is preferred. That is, the present invention encompasses the use of the above-described polyamide resin composition as a molded article and the use of the polyamide resin composition as an injection molded article.

The molded article produced from the polyamide resin composition of the present invention can be advantageously used as an injection welding part and a fuel part which is required to be subjected to laser marking, and has excellent electrical conductivity and excellent laser marking property, and therefore can be especially advantageously used as a fuel part which is required to be subjected to laser marking. That is, the present invention encompasses the use of the above-described polyamide resin composition as an injection welding part and the use of the polyamide resin composition as a fuel part.

EXAMPLES

Hereinbelow, the present invention will be described in more detail with reference to the following Examples and Comparative Examples, which should not be construed as limiting the scope of the present invention.

[Relative Viscosity]

A relative viscosity was measured under the conditions in 96% sulfuric acid at a polymer concentration of 1% at a temperature of 25° C. in accordance with JIS K-6920.

[Terminal Amino Group Concentration]

A terminal amino group concentration ($10^{-5}$ eq/g) was measured by dissolving a polyamide resin in a phenol/methanol mixed solution and subjecting the resultant solution to titration with 0.05 N hydrochloric acid.

[Terminal Carboxyl Group Concentration]

A terminal carboxyl group concentration ($10^{-5}$ eq/g) was measured by dissolving a polyamide resin in benzyl alcohol and subjecting the resultant solution to titration with a 0.05 N sodium hydroxide solution.

[Laser Marking Property]

The polyamide resin compositions in the Examples and Comparative Examples were individually molded by an injection molding machine into a 100×70×3 mm molded article, and, with respect to the molded article, printing was made using a laser marker, manufactured by Keyence Corporation, using a $YVO_4$ (yttrium vanadate) crystal laser under conditions such that the printing speed is 1,000 mm/sec, the output is 40%, and the frequency is 20 kHz.

The surface of the molded article on which printing was made by marking under the above-mentioned conditions was visually observed as shown in FIG. 1, and evaluated in accordance with the following criteria.

A: It is possible to read the letters.
B: It is difficult to read the letters.

[Volume Resistivity (in Absolute Dry State)]

The polyamide resin compositions in the Examples and Comparative Examples were individually molded by an injection molding machine into a 100×70×3 mm molded article, and then, using Hiresta UP MCP-HT450, manufactured by Mitsubishi Chemical Analytech Co., Ltd., the URS probe attached to Hiresta UP MCP-HT450 was contacted with the center of the surface of the molded article and a voltage of 10 V was applied to the molded article for 30 seconds, and, after the passage of 30 seconds, a volume resistivity was measured. This operation was repeated five times, and an average of the five measurement values was obtained.

For the purpose of suppressing discharge, the acceptance criterion was a volume resistivity of $10^7$ Ω·cm or less.

[Volume Resistivity (after Treated with CE10 at 60° C.×1,000 h)]

The polyamide resin compositions in the Examples and Comparative Examples were individually molded by an injection molding machine into a 100×70×3 mm molded article. Synthetic gasoline prepared by adding ethanol in an amount of 10% by volume to Fuel C having a toluene-to-isooctane ratio of 1:1 was placed in a stainless steel autoclave, and the molded article was immersed in the synthetic gasoline at 60° C. for 1,000 hours. Then, the molded article was removed from the autoclave, and allowed to stand in an atmosphere at 23° C. at 50% RH for 24 hours, and, using Hiresta UP MCP-HT450, manufactured by Mitsubishi Chemical Analytech Co., Ltd., the URS probe attached to Hiresta UP MCP-HT450 was contacted with the center of the surface of the resultant molded article and a voltage of 10 V was applied to the molded article for 30 seconds, and, after the passage of 30 seconds, a volume resistivity was measured. This operation was repeated five times, and an average of the five measurement values was obtained.

For the purpose of suppressing discharge, the acceptance criterion was a volume resistivity of $10^7$ Ω·cm or less.

[Dimensional Change Rate after Immersion in Fuel]

Figure 2:
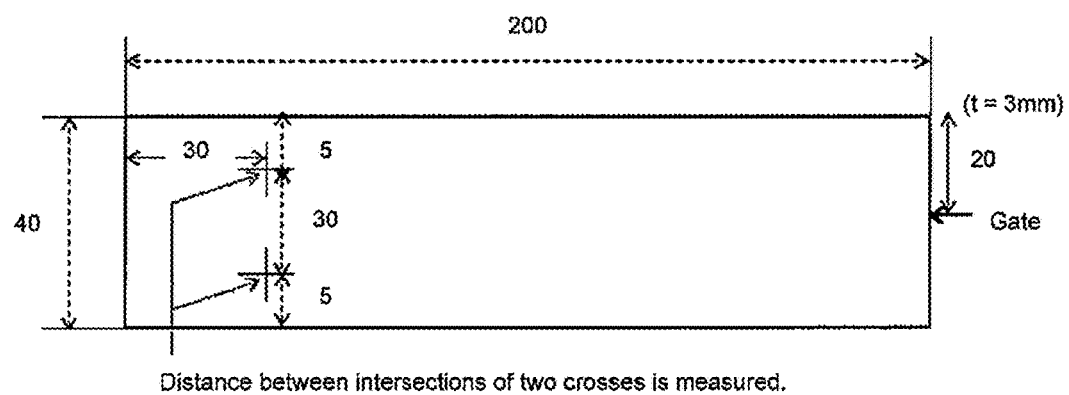
FIG. 2 A view showing the measured sites of the molded article used for measuring a dimensional change rate after immersion in the fuel.

The polyamide resin compositions in the Examples and Comparative Examples were individually molded by an injection molding machine into a 200 mm×40 mm×3 mm molded article shown in FIG. 2, and allowed to stand in an atmosphere at 23° C. at 50% RH for 48 hours and then, a distance between the marking lines formed in the surface of the molded article was measured by means of a microscope, manufactured by OLYMPUS CORPORATION, to obtain a dimension before immersed in the fuel. The unit of the figures shown in FIG. 2 is mm.

Then, synthetic gasoline (CE10) prepared by adding ethanol in an amount of 10% by volume to Fuel C having a toluene-to-isooctane ratio of 1:1 was placed in a stainless steel autoclave, and the molded article was immersed in the synthetic gasoline at 60° C. for 1,000 hours and then, a distance between the marking lines formed in the surface of the molded article was measured by means of a microscope, manufactured by OLYMPUS CORPORATION, to obtain a dimension after immersed in the fuel.

Using the above-obtained dimension before immersed in the fuel and dimension after immersed in the fuel, a dimensional change rate after immersion in the fuel was determined from the formula for calculation shown below. The dimensional change rate after immersion in the fuel was determined with respect to the both directions of the machine direction (MD direction) and the transverse direction (TD direction).

Dimensional change rate after immersion in fuel (%)=(Dimension after treated with fuel−Dimension before treated with fuel)/Dimension before treated with fuel×100

[Polyamide Resin]

PA-1 20 kg of ε-caprolactam as a polymerizable monomer and 0.5 kg of water and metaxylylenediamine were charged into a 70 liter autoclave so that the ratio of metaxylylenediamine to ε-caprolactam became 1/290 (eq/mol lactam), and the autoclave was purged with nitrogen gas, and then the mixture was heated to 100° C. and stirred so that the mixture in the autoclave became uniform. Then, polymerization was performed in the autoclave at 260° C. under 1.7 MPa to obtain polyamide 6 (hereinafter, frequently referred to as "PA-1").

The relative viscosity, terminal amino group concentration, and terminal carboxyl group concentration of the obtained PA-1 were 2.47, 5.9 ($10^{-5}$ eq/g), and 4.6 ($10^{-5}$ eq/g), respectively.

PA-2 20 kg of ε-caprolactam as a polymerizable monomer and 0.5 kg of water and metaxylylenediamine were charged into a 70 liter autoclave so that the ratio of metaxylylenediamine to ε-caprolactam became 1/290 (eq/mol lactam), and the autoclave was purged with nitrogen gas, and then the mixture was heated to 100° C. and stirred so that the mixture in the autoclave became uniform. Then, polymerization was performed in the autoclave at 260° C. under 1.7 MPa to obtain polyamide 6 (hereinafter, frequently referred to as "PA-2").

The relative viscosity, terminal amino group concentration, and terminal carboxyl group concentration of the obtained PA-2 were 2.41, 9.6 ($10^{-5}$ eq/g), and 2.6 ($10^{-5}$ eq/g), respectively.

PA-3 Polyamide 66 (hereinafter, frequently referred to as "PA-3") of which the relative viscosity measured under the conditions in 96% by mass sulfuric acid at a polyamide concentration of 1% by mass at a temperature of 25° C. in accordance with JIS K-6920, the terminal amino group concentration, and the terminal carboxyl group concentration are 2.75, 3.7 ($10^{-5}$ eq/g), and 6.3 ($10^{-5}$ eq/g), respectively.

PA-4 Polyamide 6/66 (hereinafter, frequently referred to as "PA-4") of which the relative viscosity measured under the conditions in 96% by mass sulfuric acid at a polyamide concentration of 1% by mass at a temperature of 25° C. in accordance with JIS K-6920, the terminal amino group concentration, and the terminal carboxyl group concentration are 3.04, 5.2 ($10^{-5}$ eq/g), and 4.5 ($10^{-5}$ eq/g), respectively.

[PAN Carbon Fiber]

CF-1 TRO6NL B6R, manufactured by Mitsubishi Rayon Co., Ltd., which is a PAN carbon fiber (hereinafter, frequently referred to as "CF-1") was used.

[Carbon Black]

CB-1 HI BLACK 890B, manufactured by Orion Engineered Carbons, which is furnace black (hereinafter, frequently referred to as "CB-1") was used.

CB-2 Ketjen black EC600JD, manufactured by Lion Corporation, which is ketjen black (hereinafter, frequently referred to as "CB-2") was used.

[Black Dye]

BA-1 SPIRIT BLACK, manufactured by Orient Chemical Industries Co., Ltd., which is nigrosine (hereinafter, frequently referred to as "BA-1") was used.

[Glass Fiber]

GF-1 T-249, manufactured by Nippon Electric Glass Co., Ltd., which is a glass fiber having a circular cross-section and having a glass fiber diameter of 13 μm (hereinafter, frequently referred to as "GF-1") was used.

GF-2 T-249H, manufactured by Nippon Electric Glass Co., Ltd., which is a glass fiber having a circular cross-section and having a glass fiber diameter of 10.5 μm (hereinafter, frequently referred to as "GF-2") was used.

GF-3 CSO3TA FT692, manufactured by Owens Corning Japan Ltd., which is a glass fiber having a circular cross-section and having a glass fiber diameter of 23 μm (hereinafter, frequently referred to as "GF-3") was used.

GF-4 CGS 3PA-820S, manufactured by Nitto Boseki Co., Ltd., which is a glass fiber having an irregular form cross-section, in which the long diameter and the short diameter in the cross-section taken along the direction perpendicular to the longitudinal direction of the fiber are 28 μm and 7 μm, respectively, and the ratio of the long diameter to the short diameter is 4.0, (hereinafter, frequently referred to as "GF-4") was used.

[Fluidity-Improving Agent]

FA-1 Pentarit®, manufactured by Koei Chemical Co., Ltd., which is pentaerythritol (hereinafter, frequently referred to as "FA-1") was used.

FA-2 Trimethylolethane, manufactured by Mitsubishi Gas Chemical Company, Inc., (hereinafter, frequently referred to as "FA-2") was used.

Examples 1 to 20 and Comparative Examples 1 to 6

The polyamide resin, PAN carbon fiber, carbon black, black dye, glass fiber, and fluidity-improving agent shown in Table 1 were mixed in the formulation shown in Table 1 and kneaded using a twin-screw extruder, and pelletized by means of a pelletizer to obtain pellets of a polyamide resin composition. Using the obtained pellets of the polyamide resin composition, the measurement and evaluation were performed in accordance with the methods described above. The results are shown in Table 1.

TABLE 1

| | | PA-1 wt % | PA-2 wt % | PA-3 wt % | PA-4 wt % | CF-1 wt % | CB-1 wt % | CB-2 wt % | BA-1 wt % | GF-1 wt % | GF-2 wt % | GF-3 wt % | GF-4 wt % | FA-1 wt % | FA-2 wt % |
|---|---|---|---|---|---|---|---|---|---|---|---|---|---|---|---|
| Example | 1 | 91.72 | | | | 8.00 | 0.12 | | 0.08 | | | | | 0.08 | |
| | 2 | 87.72 | | | | 12.00 | 0.12 | | 0.08 | | | | | 0.08 | |
| | 3 | 81.72 | | | | 15.00 | 0.12 | | 0.08 | | | | | 0.08 | |
| | 4 | 87.72 | | | | 12.00 | | 0.12 | 0.08 | | | | | 0.08 | |
| | 5 | 59.72 | | | | 8.25 | 0.12 | | 0.08 | 31.75 | | | | 0.08 | |
| | 6 | 49.72 | | | | 8.25 | 0.12 | | 0.08 | 41.75 | | | | 0.08 | |
| | 7 | 54.72 | | | | 8.25 | 0.12 | | 0.08 | 36.75 | | | | 0.08 | |
| | 8 | 54.72 | | | | 12.00 | 0.12 | | 0.08 | 33.00 | | | | 0.08 | |
| | 9 | | 54.72 | | | 8.25 | 0.12 | | 0.08 | 36.75 | | | | 0.08 | |
| | 10 | | | 54.72 | | 8.25 | 0.12 | | 0.08 | 36.75 | | | | 0.08 | |
| | 11 | | | | 54.72 | 8.25 | 0.12 | | 0.08 | 36.75 | | | | 0.08 | |
| | 12 | 54.80 | | | | 8.25 | 0.12 | | 0.08 | 36.75 | | | | 0.08 | |
| | 13 | 54.72 | | | | 8.25 | 0.12 | | 0.08 | 36.75 | | | | | 0.08 |
| | 14 | 54.72 | | | | 8.25 | 0.12 | | 0.08 | | 36.75 | | | 0.08 | |
| | 15 | 54.72 | | | | 8.25 | 0.12 | | 0.08 | | | 36.75 | | 0.08 | |
| | 16 | 54.72 | | | | 8.25 | 0.12 | | 0.08 | | | | 36.75 | 0.08 | |
| | 17 | 54.82 | | | | 8.25 | 0.05 | | 0.05 | 36.75 | | | | 0.08 | |
| | 18 | 54.12 | | | | 8.25 | 0.50 | | 0.30 | 36.75 | | | | 0.08 | |
| | 19 | 54.57 | | | | 8.25 | 0.05 | | 0.30 | 36.75 | | | | 0.03 | |
| | 20 | 54.37 | | | | 8.25 | 0.50 | | 0.05 | 36.75 | | | | 0.08 | |
| Comparative Example | 1 | | 53.78 | | | 8.25 | 0.60 | | 0.40 | 36.75 | | | | 0.08 | |
| | 2 | 54.58 | | | | 7.25 | 0.12 | | 0.08 | 37.75 | | | | 0.08 | |
| | 3 | | 54.72 | | | 30.00 | 0.12 | | 0.08 | 15.00 | | | | 0.08 | |
| | 4 | | 54.91 | | | 8.25 | 0.01 | | 0.01 | 36.75 | | | | 0.08 | |
| | 5 | | 54.91 | | | 8.25 | 0.01 | | 0.005 | 36.75 | | | | 0.08 | |
| | 6 | | 52.91 | | | 8.25 | 0.01 | | 2.00 | 36.75 | | | | 0.08 | |

| | | Laser marking property — | Volume resistivity (in absolute dry state) $\Omega \cdot cm$ | Volume resistivity (after treated with CE10 at 60° C. × 1,000 h) $\Omega \cdot cm$ | Dimensional change rate after immersion in fuel (Machine direction) % | Dimensional change rate after immersion in fuel (Transverse direction) % |
|---|---|---|---|---|---|---|
| Example | 1 | A | $10^5$ | $10^7$ | 1.2 | 1.3 |
| | 2 | A | $10^4$ | $10^7$ | 1.1 | 1.3 |
| | 3 | A | $10^3$ | $10^6$ | 1.0 | 1.2 |
| | 4 | A | $10^4$ | $10^6$ | 1.1 | 1.3 |
| | 5 | A | $10^5$ | $10^7$ | 0.2 | 1.1 |
| | 6 | A | $10^5$ | $10^7$ | 0.1 | 0.8 |
| | 7 | A | $10^5$ | $10^7$ | 0.1 | 1.0 |
| | 8 | A | $10^3$ | $10^5$ | 0.2 | 1.1 |
| | 9 | A | $10^5$ | $10^7$ | 0.1 | 1.0 |
| | 10 | A | $10^5$ | $10^7$ | 0.1 | 0.9 |
| | 11 | A | $10^5$ | $10^7$ | 0.2 | 1.3 |
| | 12 | A | $10^5$ | $10^7$ | 0.1 | 1.0 |
| | 13 | A | $10^5$ | $10^7$ | 0.1 | 1.0 |
| | 14 | A | $10^5$ | $10^7$ | 0.1 | 0.3 |
| | 15 | A | $10^5$ | $10^7$ | 0.2 | 0.9 |
| | 16 | A | $10^5$ | $10^7$ | 0.1 | 0.9 |
| | 17 | A | $10^5$ | $10^7$ | 0.1 | 1.0 |
| | 18 | A | $10^5$ | $10^7$ | 0.1 | 1.0 |
| | 19 | A | $10^5$ | $10^7$ | 0.1 | 1.0 |
| | 20 | A | $10^5$ | $10^7$ | 0.1 | 1.0 |
| Comparative Example | 1 | B | $10^5$ | $10^7$ | 0.1 | 1.0 |
| | 2 | A | $10^7$ | $10^{11}$ | 0.1 | 1.0 |
| | 3 | B | $10^3$ | $10^5$ | 0.1 | 1.0 |
| | 4 | B | $10^5$ | $10^7$ | 0.1 | 1.0 |
| | 5 | B | $10^5$ | $10^7$ | 0.1 | 1.0 |
| | 6 | B | $10^5$ | $10^7$ | 0.1 | 1.0 |

The whole of the disclosure of Japanese Patent Application No. 2014-218635 (application date: Oct. 27, 2014) and the whole of the disclosure of Japanese Patent Application No. 2014-223413 (application date: Oct. 31, 2014) are included in the present specification by making a reference to them. All the reference documents, patent applications, and technical standards described in the present specification are included in the present specification by making a reference to them to the same extent as that in the case where each of the reference documents, patent applications, and technical standards is specifically and individually shown to be included in the present specification by making a reference to each of them.

The invention claimed is:

1. A fuel part requiring laser marking, comprising a polyamide resin composition comprising a polyamide resin, a PAN carbon fiber, carbon black, a black dye, a glass fiber, and a fluidity-increasing agent,
   wherein the polyamide resin composition,
   contains the PAN carbon fiber in an amount of 7.5 to 25% by weight, based on the weight of the composition,
   contains the carbon black in an amount of 0.03 to 0.52% by weight, based on the weight of the composition,
   contains the black dye in an amount of 0.02 to 0.5% by weight, based on the weight of the composition,
   contains the glass fiber in an amount of 15 to 60% by weight, based on the weight of the composition, and
   contains the fluidity-increasing agent in an amount of 0.01 to 5% by weight, based on the weight of the composition,
   wherein the polyamide resin consists of at least one polyamide resin selected from the group consisting of polyamide 6, polyamide 66, polyamide 610, polyamide 1010, polyamide 6/66, polyamide 11, polyamide 12, polyamide 6/12, and polyamide 6/66/12.

2. The fuel part according to claim 1, wherein the polyamide resin composition contains the black dye in an amount of 0.05 to 0.3% by weight, based on the weight of the composition.

3. The fuel part according to claim 1, wherein the polyamide resin comprises a polyamide resin having a terminal amino group concentration which is larger than a terminal carboxyl group concentration.

4. The fuel part according to claim 1, wherein the polyamide resin is polyamide 6 and/or polyamide 66.

5. The fuel part according to claim 1, wherein the fluidity-increasing agent is at least one polyhydric alcohol selected from the group consisting of pentaerythritol, dipentaerythritol, and trimethylolethane.

* * * * *